(12) United States Patent
Kim et al.

(10) Patent No.: US 7,927,771 B2
(45) Date of Patent: Apr. 19, 2011

(54) COLOR FILTER AND FABRICATION METHOD THEREOF

(75) Inventors: Ji-hoon Kim, Seoul (KR); Kye-si Kwon, Seoul (KR); Jung-yong Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1349 days.

(21) Appl. No.: 11/431,714

(22) Filed: May 11, 2006

(65) Prior Publication Data

US 2006/0263705 A1 Nov. 23, 2006

(30) Foreign Application Priority Data

May 18, 2005 (KR) .................. 10-2005-0041770

(51) Int. Cl.
*G03F 1/00* (2006.01)
(52) U.S. Cl. .......................................................... 430/7
(58) Field of Classification Search ........................ 430/7
See application file for complete search history.

(56) References Cited

U.S. PATENT DOCUMENTS

| | | | |
|---|---|---|---|
| 5,066,512 A | | 11/1991 | Goldowsky et al. |
| 2002/0098435 A1* | | 7/2002 | Rohr et al. ............ 430/108.22 |
| 2003/0108804 A1* | | 6/2003 | Cheng et al. ............ 430/7 |
| 2004/0060583 A1* | | 4/2004 | Ryu ............................. 134/61 |
| 2005/0159501 A1* | | 7/2005 | Kiefer-Liptak .............. 522/71 |

FOREIGN PATENT DOCUMENTS

| | | |
|---|---|---|
| EP | 0862156 | 9/1998 |
| EP | 1553809 | 7/2005 |
| IE | 20020 | 5/2003 |
| JP | 07191211 | 7/1995 |
| JP | 09080417 | * 3/1997 |
| JP | 2002-365424 | 12/2002 |
| WO | WO 2004/028707 | 4/2004 |
| WO | WO 2004/030417 | 4/2004 |

OTHER PUBLICATIONS

Translation JP-09080417( Mar. 1997).*
European Search Report dated Oct. 16, 2006 issued in EP 6252191.

* cited by examiner

*Primary Examiner* — Cynthia H Kelly
*Assistant Examiner* — Anna L Verderame
(74) *Attorney, Agent, or Firm* — Stanzione & Kim, LLP

(57) ABSTRACT

A color filter and a fabrication method thereof are provided. In the method, color filter ink that includes wax beads is ejected by an inkjet printing process. A black matrix defining R/G/B pixels is formed on a first surface of a substrate and transparent electrodes are formed on a second surface of the substrate opposite to the first surface at positions corresponding to the R/G/B pixels. The fabricated color filter ink is injected into an inkjet head, and the color filter ink is ejected from the inkjet head into each of the R/G/B pixels. A predetermined voltage is applied between the inkjet head and the transparent electrode such that the ejected color filter ink is precisely injected into each of the R/G/B pixels.

7 Claims, 4 Drawing Sheets

COLOR FILTER AND FABRICATION METHOD THEREOF

CROSS-REFERENCE TO RELATED APPLICATIONS

This application claims the benefit of Korean Patent Application No. 10-2005-0041770, filed on May 18, 2005, in the Korean Intellectual Property Office, the disclosure of which is incorporated herein in its entirety by reference.

BACKGROUND OF THE INVENTION

1. Field of the Invention

The present general inventive concept relates to a color filter used in a display, and more particularly, to a color filter used in a wide-screen display such as a liquid crystal display (LCD) and a method of fabricating the same.

2. Description of the Related Art

With the advance of PCs (specifically, portable PCs), demand for LCDs (specifically, color LCDs) has increased. However, wide use of LCDs requires a reduction in a high manufacturing cost of the LCDs. Since color filters used in the LCDs are particularly expensive to fabricate, a color filter fabrication cost should be substantially reduced in order to reduce the manufacturing cost of the LCDs.

A color filter fabrication method is an important part of implementing a high image quality of LCDs. Many color filter fabrication methods have been proposed to implement the high image quality of LCDs. Examples of conventional color filter fabrication methods are a pigment dispersion method, a dyeing method, an electrodeposition method, and a printing method.

In the pigment dispersion method, a pigment dispersion photosensitive resin layer is formed on a substrate and then patterned into a monochromic pattern. This process is repeated three times, thereby obtaining R/G/B color filter layers.

In the dyeing method, a glass substrate is coated with a water-soluble high-molecular dyeing material. The dyeing material is then patterned into a predetermined pattern using photolithography, and a colored pattern is obtained by immersing the predetermined pattern into a dyeing solution. This process is repeated three times, thereby obtaining the R/G/B color filter layers.

In the electrodeposition method, a transparent electrode is patterned on a substrate, and a resulting structure is immersed into an electrodeposition coating solution to electrodeposit a first color. This process is repeated three times, thereby forming the R/G/B color filter layers. Finally, the formed R/G/B color filter layers are baked.

In the printing method, a pigment is dispersed into a thermosetting resin to perform a printing process three times, thereby forming the R/G/B color filter layers. The thermosetting resin is thermoset to form a colored layer.

In all the above-described conventional methods, a protection layer is formed on a colored layer that includes the color filter layers.

A common feature of the above-described conventional methods is that the R/G/B colored layers are obtained by repeating an identical process three times. This repetition, however, increases the color filter fabrication cost and reduces a processing yield. In addition, the conventional electrodeposition method is limited in terms of a pattern shape, and thus this method is difficult to apply to a thin film transistor (TFT) LCD. Moreover, since the conventional printing method has a low resolution and smoothness, a fine-pitch pattern is difficult to form using the printing method.

Color filter fabrication methods that attempt to solve the problems described above using an inkjet printing process are described in Japanese Patent Laid-open Publication Nos. SHO 59-75205, SHO 63-235901 and HEI 1-217320. Using these color filter fabrication methods, R/G/B colorant-containing ink is sprayed onto a transparent substrate by the inkjet printing process, and the sprayed ink is dried to form a colored image region. In the color filter fabrication methods using the inkjet printing process, R/G/B pixels can be simultaneously formed, a process of fabricating the color filter can be simplified, and the color filter fabrication cost can be reduced.

In the inkjet printing process for fabricating the color filter, an ink of a selected color is ejected from ink ejection nozzles into each pixel region while an upper surface of a color filter substrate is scanned by an inkjet head, thereby coloring the pixel regions. However, amounts of ink that are ejected from the ink ejection nozzles tends to vary, slightly. Therefore, when a row of pixels is colored using one ink ejection nozzle, neighboring rows of pixels can be colored by different amounts of ink. In this case, color nonuniformity occurs between the neighboring pixel rows. In an effort to reduce the color nonuniformity that results, a method of coloring pixels by performing a scanning operation several times using different nozzles in the respective scanning operations has been proposed. However, since ink ejected in the respective scanning operations may overlap with one another at several portions of each pixel row, the color nonuniformity cannot be sufficiently reduced, unless ink is properly distributed in each scanning operation.

In an effort to solve the problem of overlapping ink and nonuniformity when forming a color filter, U.S. Pat. No. 5,066,512 proposed a method of fabricating a color filter by condensing ink that is ejected using an electrode. However, in this method, when one pixel of a closely-arranged black matrix is electrified by a first electric charge and the other neighboring pixels are electrified by a second electric charge, an insulation problem may occur. In addition, when a finely-ejected ink lands in an undesired region, a resulting defect is impossible to correct.

FIG. 1 illustrates a phenomenon that occurs when using a conventional inkjet system for fabricating a color filter in which ink 15 is made of a mixture of carriers with pigments, dispersants, binders, and monomers. As illustrated in FIG. 1, when the ink 15 is ejected into a pixel (i.e., between a black matrix 12) by an inkjetting process, the ink 15 may overflow on the black matrix 12 on a substrate 10. In more extreme cases, the ink 15 may flow into a neighboring pixel, which causes a bleeding phenomenon.

SUMMARY OF THE INVENTION

The present general inventive concept provides a color filter and a fabrication method thereof using inkjetting color filter ink into which wax beads are added.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a method of fabricating a color filter, the method including fabricating a color filter ink including wax beads, forming a black matrix to define R/G/B pixels on a first surface of a substrate and forming transparent electrodes on a second surface of the substrate opposite the first surface at positions corresponding to the R/G/B pixels, injecting the fabricated color filter ink into an inkjet head and ejecting the color filter ink from the inkjet head into each of the R/G/B pixels, and applying a predetermined voltage between the inkjet head and the transparent electrodes such that the ejected color filter ink is precisely injected into each of the R/G/B pixels.

The foregoing and/or other aspects of the present general inventive concept are also achieved by providing a method of fabricating a color filter, the method including forming a black matrix to define R/G/B pixels on a first surface of a substrate and forming transparent electrodes on a second surface of the substrate opposite the first surface at positions corresponding to the R/G/B pixels, ejecting color filter ink including wax beads from an inkjet head into each of the R/G/B pixels, applying a predetermined voltage between the inkjet head and the transparent electrode such that the ejected color filter ink is precisely injected into each of the R/G/B pixels, and removing the transparent electrodes from the substrate.

The foregoing and/or other aspects of the present general inventive concept are also achieved by providing a method of fabricating a color filter, the method including ejecting color filter ink onto color pixels defined on a first surface of a substrate, and applying a predetermined voltage to the color filter ink using electrodes positioned on a second surface of the substrate and corresponding to the defined color pixels.

The foregoing and/or other aspects of the present general inventive concept are also achieved by providing a method of fabricating a color filter, the method including ejecting ink onto predetermined areas of a substrate, the ink including a carrier portion and a pigment portion, and controlling the pigment portion to move with respect to the carrier portion toward the substrate in the predetermined areas by applying a voltage using an electrode disposed on the substrate.

The foregoing and/or other aspects of the present general inventive concept are also achieved by providing a color filter substrate, including a transparent substrate, a black matrix disposed on the substrate to define color pixels, and a color ink having a carrier portion disposed on the color pixels and extending over portions of the black matrix, the carrier portion containing a pigment portion disposed in an area closest to a surface of the substrate in each pixel.

The foregoing and/or other aspects of the present general inventive concept are also achieved by providing a color filter substrate, including a transparent substrate having first and second surfaces, a black matrix disposed on a first surface of the substrate to define color pixels, and a transparent electrode disposed on the second surface of the substrate to correspond to the defined color pixels.

The foregoing and/or other aspects of the present general inventive concept are also achieved by providing a color filter production apparatus to produce a color filter on a substrate having first and second surfaces, the apparatus including an inkjet head disposed above the first surface of the substrate to eject ink onto predetermined areas on the first surface of the substrate, the ink including a carrier portion and a pigment portion, and an electrode disposed on the second surface of the substrate to control the pigment portion to move with respect to the carrier portion toward the first surface of the substrate in the predetermined areas by applying a voltage.

The foregoing and/or other aspects of the present general inventive concept are also achieved by providing a color filter including a substrate having a first surface on which black matrixes defining R/G/B pixels are formed and a second surface opposite the first surface on which transparent electrodes are formed at positions corresponding to the R/G/B pixels, and a color filter ink disposed in each of the R/G/B pixels.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
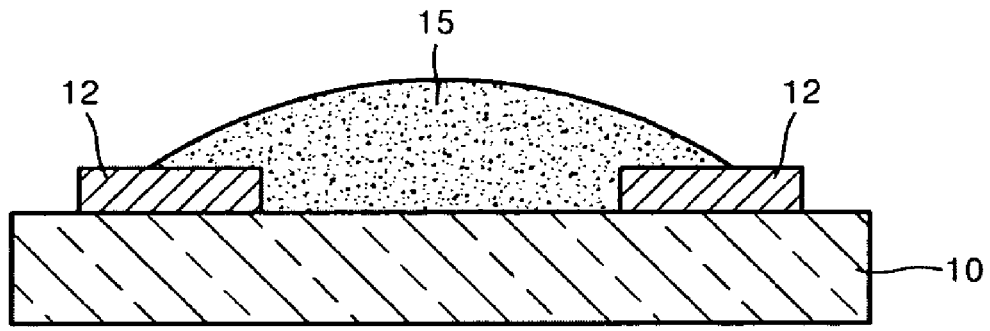
FIG. 1 is a view illustrating a phenomenon that occurs during a conventional color filter fabrication method using an inkjet process.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIGS. 2A through 2G illustrate a method of fabricating a color filter according to an embodiment of the present general inventive concept.

A color filter ink used for inkjetting is fabricated before the method of fabricating the color filter of the present embodiment is performed.

Figure 2A:
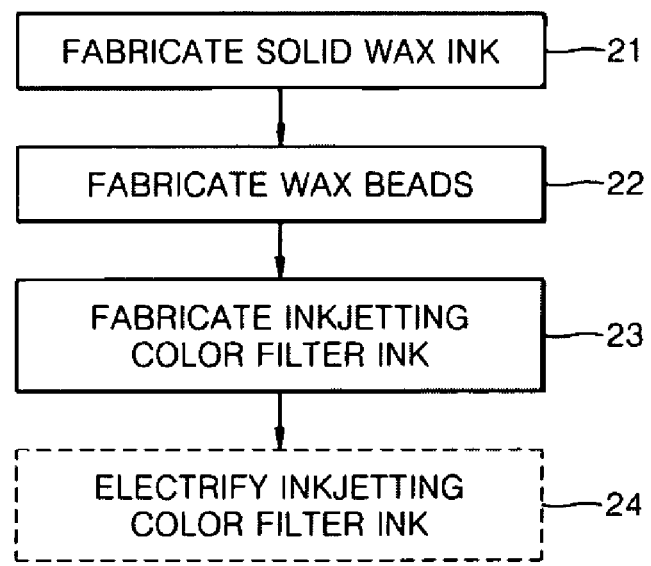
FIG. 2A is a flow diagram illustrating a process of fabricating an ink (i.e., a color filter ink) usable in inkjetting fabrication process used to manufacture a color filter, according to an embodiment of the present general inventive concept.

FIG. 2A is a flow diagram illustrating a process of fabricating the color filter ink.

Referring to FIG. 2A, in operation 21, pigments, dispersants, wax, and monomers are mixed in a predetermined ratio to fabricate a solid wax ink. The dispersants disperse the pigments into the wax. The dispersants may be ionic dispersants or polymeric dispersants.

In operation 22, the solid wax ink is heated by liquid electro polarization to make the solid wax ink fluid, and the heated wax ink is sprayed by a sprayer, thereby forming wax beads with a particle size of about 1 μm.

The wax beads are solid particles that cannot be directly used as ink for inkjetting. In operation 23, the wax beads are uniformly mixed with carriers (e.g., water or organic solvent), thereby forming the color filter ink.

The fabrication process of the color filter ink may further include an operation 24 of electrifying the color filter ink to create a predetermined polarity in the color filter ink. When electrifying the color filter ink, both the wax beads, which are solid particles, and the carriers, which is a liquid, are given the predetermined polarity. In this case, the color filter ink can be controlled using a predetermined voltage V. For example, as described below, each pixel on a transparent substrate 31 (described below) can be precisely filled with the color filter ink when the predetermined voltage V is applied between an inkjet head 36 (described below) and a transparent electrode 33 (described below) formed on the transparent substrate 31. Additionally, the wax beads (solid particles) can be moved within the carriers (liquid) using the predetermined voltage V.

Figure 2B:
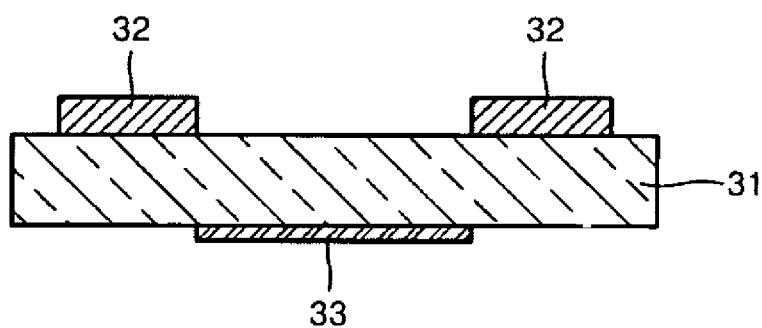
FIG. 2B is a sectional view illustrating a process of forming a black matrix and a transparent electrode on a transparent substrate, according to an embodiment of the present general inventive concept.

FIG. 2B is a sectional view illustrating a process of forming a black matrix 32 and the transparent electrode 33 on the transparent substrate 31. The processes of FIGS. 2B through 2G, which are described below, may be performed with the color filter ink fabricated using the process of FIG. 2A.

Referring to FIG. 2B, the black matrix 32 is formed on an upper surface of the transparent substrate 31 by a patterning process to define R/G/B pixels. Thereafter, the transparent electrode 33 is formed on a lower surface of the transparent substrate 31. The transparent electrode 33 controls electrified color filter ink 34 and 35 (described below) to precisely fill an inside of each pixel. The electrified color filter ink 34 and 35 may be fabricated using the process of FIG. 2A. The transparent electrode 33 may be formed of indium tin oxide (ITO). Other materials may also be used to form the transparent electrode 33. Since each pixel should be filled with the electrified color filter ink, the transparent electrode 33 may be disposed at a center between neighboring black matrixes 32 and formed to correspond to a width and a length of a portion of the transparent substrate 31 corresponding to a region between the neighboring black matrixes 32.

Figure 2C:
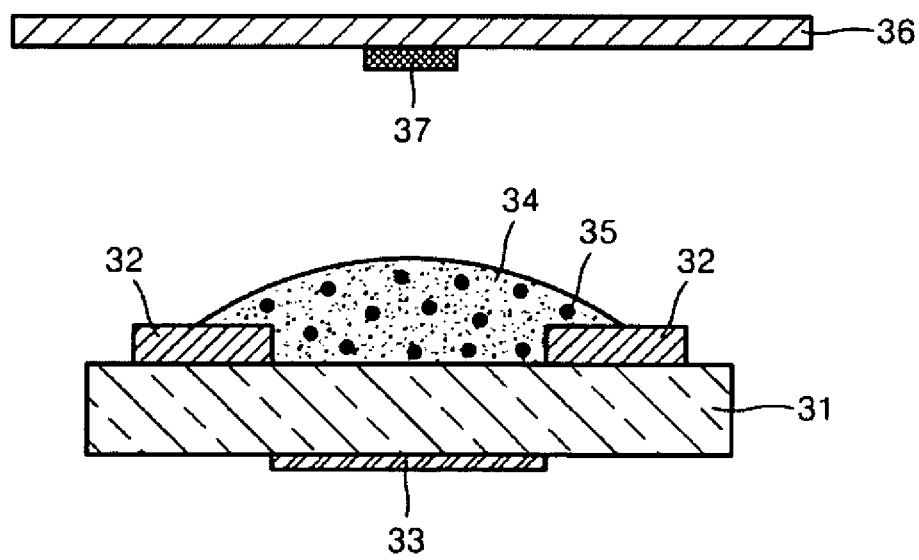
FIG. 2C is a sectional view illustrating a process of ejecting the color filter ink from an inkjet head into each pixel, according to an embodiment of the present general inventive concept.

FIG. 2C is a sectional view illustrating a process of ejecting the color filter ink 34 and 35 from the inkjet head 36 into each pixel.

Referring to FIG. 2C, the color filter ink 34 and 35, which can be fabricated by the process illustrated in FIG. 2A, is injected into an inkjet head 36. The color filler ink 34 and 35 is then ejected through a nozzle 37 of the inkjet head 36 into each pixel defined by the black matrix 32. The reference numerals 34 and 35 represent a carrier (e.g., water or organic solvent) of the color filter ink and wax beads of the color filter ink, respectively.

Figure 2D:
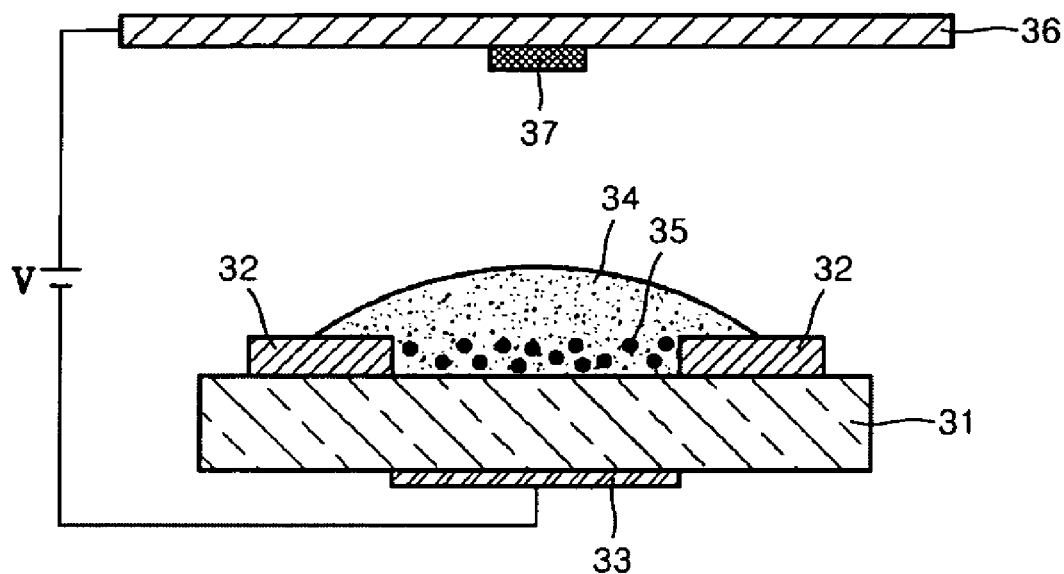
FIG. 2D is a sectional view illustrating a process of applying a predetermined voltage between the inkjet head and the transparent electrode such that the color filter ink ejected from the inkjet head is precisely positioned in each pixel, according to an embodiment of the present general inventive concept.

FIG. 2D is a sectional view illustrating a process of applying the predetermined voltage V between the inkjet head 36 and the transparent electrode 33 so that the color filter ink 34 and 35 ejected from the inkjet head 36 is precisely ejected into each pixel.

Referring to FIG. 2D, after ejecting the color filter ink 34 and 35 from the inkjet head 36, the predetermined voltage V is applied between the inkjet head 36 and the transparent electrode 33 to guide the wax beads 35 in the color filter ink 34 and 35 into the pixel. The predetermined voltage V may be applied to the transparent electrode 33 and/or the inkjet head 36 while the color filter ink 34 and 35 is being ejected from the inkjet head 36 such that ejected ink droplets are guides to the pixels. Once the color filter ink 34 and 35 is ejected from the inkjet head 36, the wax beads 35 and the carriers 34 are not uniformly disposed, but instead are mixed with each other in the pixel defined by the black matrix 32. However, since the wax beads 35 mixed with pigment provide color to the color filter, the carriers 34 are not needed and can be removed during a subsequent process. Accordingly, the predetermined voltage V is applied between the inkjet head 36 and the transparent electrode 33 to guide the wax beads 35 into the pixel between the black matrix 32. As illustrated in FIG. 2D, the wax beads 35 are moved into in the pixel by the predetermined voltage V. Alternatively, the predetermined voltage V can be applied to the transparent electrode 33 such that the transparent electrode 33 attracts the color filter ink 34 and 35, and the wax beads 35 are moved toward the transparent substrate 31 in the pixels.

If the color filter ink 34 and 35 is previously electrified to have an electric charge with the predetermined polarity (e.g., by the operation 24 of the fabrication process of FIG. 2A), a first voltage with the same polarity as the electric charge of the color filter ink 34 and 35 may be applied to the inkjet head 36 and a second voltage with an opposite polarity may be applied to the transparent electrode 33. In this case, the wax beads 35 are moved toward and located near the transparent electrode 33 in the pixel, while the carriers 34 (e.g., water or organic solvent) are located further from the transparent electrode 33.

Figure 2E:
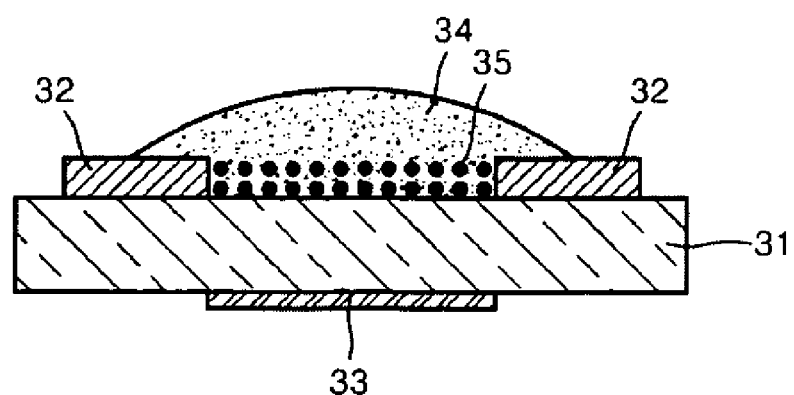
FIG. 2E is a sectional view illustrating a process of heating and removing carriers (e.g., water or organic solvent) from the color filter ink in each pixel, according to an embodiment of the present general inventive concept.

FIG. 2E is a sectional view illustrating a process of heating and removing the carriers 34 from the color filter ink 34 and 35.

Referring to FIG. 2E, a heating process such as a baking process is performed to vaporize and remove the carriers 34 (e.g., water or organic solvent) from the color filter ink 34 and 35 in each pixel without disturbing the wax beads 35 disposed in the pixels defined by the black matrix 32. In other words, the carrier 34 is evaporated such that the wax beads 35 remain in the black matrix 32.

Figure 2F:
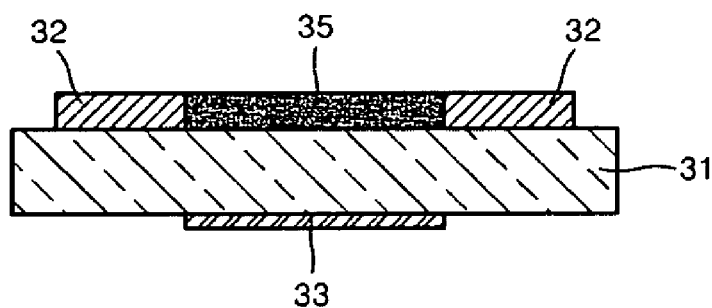
FIG. 2F is a sectional view illustrating a process of planarizing a solidified color filter ink in each pixel such that the solidified color filter ink has the same height as the black matrix, according to an embodiment of the present general inventive concept.

FIG. 2F is a sectional view illustrating a process of planarizing the wax beads 35 solidified after performing the heating process of FIG. 2E.

Referring to FIG. 2F, the wax beads 35 are melted and then solidified by the baking process, and the solidified wax beads 35 are planarized to have the same height as the black matrix 32.

Figure 2G:
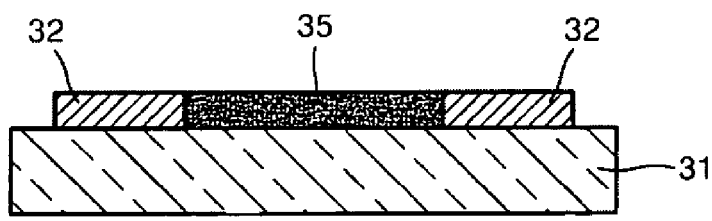
FIG. 2G is a sectional view illustrating a process of removing the transparent electrode from the transparent substrate to complete a method of fabricating the color filter, according to an embodiment of the present general inventive concept.

Thereafter, as illustrated in FIG. 2G, the transparent electrode 33 formed on the lower surface of the transparent substrate 31 is removed to complete the method of fabricating the color filter of the present embodiment.

Alternatively, the transparent electrode 33 formed on the lower surface of the transparent electrode 31 may be left on the transparent substrate 31 of the color filter.

Figure 3:
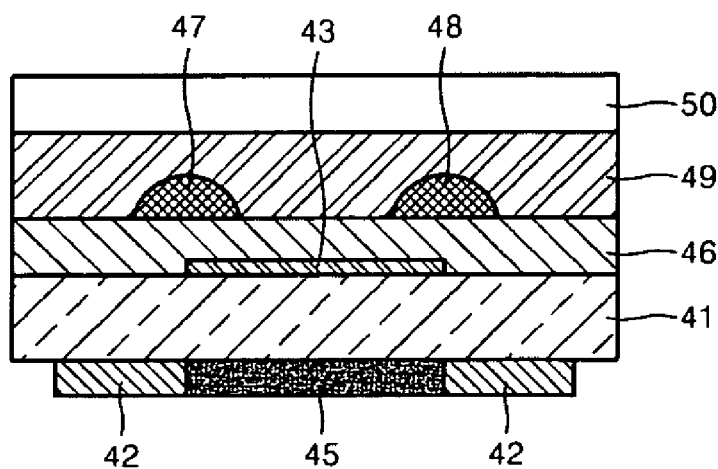
FIG. 3 is a schematic sectional view of an electroluminescence (EL) display including a color filter, according to an embodiment of the present general inventive concept.

FIG. 3 is a schematic sectional view of an electroluminescence (EL) display including a color filter having a transparent substrate 41 with a black matrix 42 to define pixels, a color ink 45 (including wax) disposed in the pixels between the black matrix 42, and a transparent electrode 43 disposed on the transparent substrate 41 on an opposite side of the pixels, according to an embodiment of the present general inventive concept. The color filter of FIG. 3 may be similar to the color filter that is manufactured by the processes of FIGS. 2A to 2G.

Referring to FIG. 3, a space between neighboring black matrixes 42 on a lower surface of the transparent substrate 41 is filled with the color ink 45 to form R/G/B pixels on the lower surface of the transparent substrate 41, and the transparent electrode 43 is formed on an upper surface of the transparent substrate 41. Reference numerals 47 and 48 represent a source and a drain of the pixel, respectively. Reference numerals 46 and 49 represent an insulation layer and a silicon layer of the EL display, respectively. A reference numeral 50 represents a white luminescent layer. In the EL display, the transparent electrode 43 can function as a gate electrode to drive the white luminescent layer 50 to emit light.

In conventional methods that use ink ejection to manufacture a color filter, ink formed of a mixture of carriers with pigments, dispersants, binders and monomers is ejected from an inkjet head into a pixel. In this case, the ink ejected into the pixel may overflow on a black matrix and may even flow into a neighboring pixel, which may cause a bleeding phenomenon. However, as described above, a color filter fabrication method of the embodiments of the present general inventive concept can solve problems associated with the conventional methods. Also, in the embodiments of the present general inventive concept, a transparent electrode formed on a transparent substrate can be used as a gate electrode in an EL display.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of fabricating a color filter, the method comprising:

forming a black matrix to define R/G/B pixels on a first surface of a substrate and forming transparent electrodes on a second surface of the substrate opposite to the first surface at positions corresponding to the R/G/B pixels;

ejecting a color filter ink including wax beads and carriers from an inkjet head into each of the R/G/B pixels;

applying a predetermined voltage between the inkjet head and the transparent electrode such that the ejected color filter ink is precisely injected into each of the R/G/B pixels such that the wax beads are positioned closer to the transparent substrate than the carriers; and removing the transparent electrodes from the substrate.

2. The method of claim 1, further comprising:

making a solid wax ink by mixing pigments, dispersants, wax, and monomers;

changing the solid wax ink into the wax beads;

uniformly mixing water or organic solvent with the wax beads to fabricate the color filter ink; and injecting the color filter ink into the inkjet head.

3. The method of claim 2, wherein the solid wax ink is changed into the wax beads by liquid electro polarization.

4. The method of claim 2, further comprising:

electrifying the color filter ink including the wax beads before ejecting the color filter ink onto the substrate.

5. The method of claim 4, wherein the applying of the predetermined voltage comprises:

applying a first voltage with the same polarity as the electrified color filter ink to the inkjet head; and applying a second voltage with an opposite polarity as the electrified color filter ink to the transparent electrode.

6. The method of claim 1, wherein the forming of the transparent electrodes comprises forming as many transparent electrodes as the R/G/B pixels formed on the substrate.

7. The method of claim 1, further comprising:

after the applying of the predetermined voltage, baking and planarizing the color filter ink injected into each of the R/G/B pixels.

\* \* \* \* \*